United States Patent Office 2,933,479
Patented Apr. 19, 1960

2,933,479

FIBERS, PELLICLES AND THE LIKE OF CROSS-LINKED ADDITION POLYMERS OF ALKOXY-METHYL VINYL SULFIDES

Charles H. McBurney, Huntingdon Valley, George A. Richter, Jr., Abington, and Benjamin B. Kine, Levittown, Pa., assignors to Rohm & Haas Company, Philadelphia, Pa., a corporation of Delaware No Drawing. Application May 29, 1956
Serial No. 587,926

19 Claims. (Cl. 260—79.7)

This invention relates to new shaped filmy structures having at least one small dimension of the order of one-tenth to twenty mils, such as fibers, filaments, films, pellicles, sheets and the like formed of cross-linkable addition polymers. It is particularly concerned with such structures in which the addition polymer has been cross-linked and which have improved dimensional stability when subjected to elevated temperatures as in laundering, ironing, and so on. It is also concerned with the processes for making the cross-linkable or cross-linked structures.

The formation of fibers or films from linear thermoplastic polymers is well-known. However, the fibers formed of such polymers generally show cold flow and undergo severe shrinkage when heated even to temperatures which are well below the acknowledged softening points of the linear polymers from which the fibers are formed. The extent of this shrinkage on heating is accentuated by the extent to which the fiber has been stretched during its manufacture, the stretching being effected for the purpose of increasing the tensile strength of the fibers, films or the like. The copolymerization of monoethylenically unsaturated monomers normally used in making the linear addition polymers with polyethylenically unsaturated monomers to effect cross-linking of the polymer structure is not a satisfactory method of producing stable fibers or films since the introduction of the cross-linking agent into the initial polymer renders it infusible and insoluble from the start, thereby interfering with the formation of the polymer into the desired fiber, fibers, or pellicular structure.

In accordance with the present invention, fibers, films and the like are produced from a polymer of monoethylenically unsaturated molecules comprising an alkoxymethyl vinyl sulfide or an alkoxymethyl-α-methyl vinyl sulfide having the structure of Formula I:

I     $CH_2=C(R)SR'OR''$ where

R is selected from the group consisting of hydrogen and methyl.

R' is a methylene, ethylidene or isopropylidene group, and

R" is an alkyl group having 1 to 8 carbon atoms, but is preferably methyl.

Since part or all of the —R'OR" portion of the compound is eliminated in the subsequent cross-linking, it is generally preferred to polymerize the simplest compound, namely the methoxymethyl vinyl sulfide, in preparing the polymers to be used in making the fibers and films of the present invention. Generally, there are used copolymers containing from 0.2% to 20% by weight of the sulfide monomer and preferably between 5% and 20% by weight thereof. It has been found that polymers containing the sulfide of Formula I are self-cross-linking when subjected to mild oxidation at elevated temperatures as will be described hereinbelow. The cross-linking reaction can be effected at any stage of the fiber-forming or film-forming process either before or after stretching, when stretching is employed therein. It, therefore, provides a means for greatly reducing the shrinkage of, or stabilizing, an unstretched product and also for greatly reducing the shrinkage of, or stabilizing, the formed product after it has been stretched so that the maximum strength obtainable can be achieved in the stabilized product.

The products of Formula I are prepared (as described in U.S. Patent 2,906,741) by first reacting mercaptoethanol or mercaptopropanol of Formula II below with a halogenated ether of Formula III below according to the following representation in which the character X is an atom of chlorine or bromine and the characters R, R', and R" have the significance described above:

$$HOCH_2CH(R)SH + XR'-O-R'' \longrightarrow$$
$$\quad\quad II \quad\quad\quad\quad III$$
$$\quad\quad\quad\quad\quad\quad HOCH_2CH(R)-S-R'-O-R''+HX$$
$$\quad\quad\quad\quad\quad\quad\quad\quad\quad\quad IV$$

The product of Formula IV of this first reaction is then dehydrated at an elevated temperature, of the order of 200° C., preferably in the presence of a dehydration catalyst according to the following equation:

$$HOCH_2CH(R)-S-R'-O-R'' \rightarrow CH_2=C(R)-S-R'-O-R''+H_2O$$
$$\quad\quad\quad IV \quad\quad\quad\quad\quad\quad\quad\quad\quad\quad\quad\quad I$$

The mercaptoalkanols which are employed in the preparation of the polymerizable sulfides are mercaptoethanol, $HOC_2H_4SH$, or mercaptopropanol, $$HOCH_2CH(CH_3)-SH$$

The halogenated ethers which are used are readily available or are easily prepared by known methods. They have the general formula

III     $X-R'-O-R''$ wherein R' is the methylene group, —$CH_2$—, the ethylidene group $$CH_3\overset{|}{C}H$$

or the isopropylidene group $$CH_3-\overset{|}{\underset{|}{C}}-CH_3$$

X is an atom of chlorine or bromine; and R" is an alkyl group containing one to eight carbon atoms. The character R" is typified by the following groups: methyl, ethyl, n-propyl, isopropyl, n-butyl, sec-butyl, isobutyl, tert-butyl, n-amyl, tert-amyl, hexyl, n-octyl and 2-ethylhexyl groups, as well as the isomers and homologues of these groups.

In the preparation of the products of Formula I, the mercaptoalkanol and the halogenated ether are best reacted at a temperature below 50° C. in the presence of a material which reacts with, or accepts, the liberated hydrogen halide readily. Temperatures from 0° C. to 50° C. have been used; but it is preferred to operate within the range of about 0° C. to about 30° C. While it is preferred to employ an alkali metal hydroxide, notably sodium hydroxide, as the acceptor for the liberated hydrogen chloride or hydrogen bromide, other materials may be used such as lime, alkali metal carbonates and organic bases such as trimethylamine, triethylamine, pyridine, dimethylbenzylamine and quaternary ammonium hydroxides typified by trimethylbenzylammonium hydroxide. For convenience, it is suggested that the reaction be carried out in the presence of an inert solvent which does not react with the starting materials or with the products. Suitable solvents include methanol, ethanol, butanol, dioxane, benzene and water.

The intermediate compound

IV      $HOCH_2CH(R)-S-R'-O-R''$ after being freed of salt and solvent by conventional means such as filtration and distillation, is next dehydrated at a temperature above about 150° C.—preferably within the temperature range of about 190° C. to about 220° C. It is recommended that the compound be heated in the presence of a catalyst such as aluminum oxide or an hydroxide of an alkali metal. A convenient method is to "flash dehydrate" by introducing the compound into a heated reactor at such a rate that it decomposes and distills out of the reactor as fast as it is added. Thereafter the unsaturated product is separated from the water and is purified by fractional distillation.

The polymers containing the sulfide of Formula I may be formed into structures having at least one small dimension, such as films, sheets, fibers, or filaments by extrusion either of a melt of the polymer, a solution thereof in water, if soluble therein, or in an organic solvent, or an aqueous dispersion of the copolymer through an extrusion device containing one or more orifices into a suitable coagulating medium which may be a cooling fluid, gaseous or liquid, in the case of melt-spinning; a heated atmosphere in the case of the dry-spinning of a solution or aqueous dispersion; or a coagulating liquid in the case of wet-spinning a solution or aqueous dispersion. Fibrous structures may also be formed by a spraying technique and so-called "cocoon" protective coverings may also be formed by spraying.

In the melt-spinning of the polymers, provision is made for bringing the polymer mass, which may preferably be in granular or pulverized form, into molten condition in proximity to the spinneret or other extrusion device. This is generally accomplished by providing a suitably heated chamber in proximity to the spinneret or other extrusion device and super-imposing upon the molten mass suitable pressure for forcing the mass through the orifice or orifices of the device. In this procedure, cross-linking can be avoided by maintaining an inert atmosphere (that is, excluding oxygen) in contact with the streams which issue from the extrusion device until after stretching is effected on the fibers or films, if stretching is desired. A cooled atmosphere of carbon dioxide, nitrogen, helium, or the like may be maintained within the space into which the molten polymer stream or streams is or are extruded. The temperature of the atmosphere may be from —50° to about 20° C.

Dry- and wet-spinning procedures may be employed with solutions of the polymers in water, if soluble therein, or in organic solvents, such as acetone, dioxane, methyl ethyl ketone, methyl isobutyl ketone, dimethylformamide, dimethylacetamide, acetonitrile, nitromethane and so on. The concentration of the copolymer in such solutions may be from about 15% to 25%. Similarly, aqueous dispersions of the copolymers made by emulsion copolymerization in aqueous media may be formed into fibers, films, and the like by either dry- or wet-spinning. The concentration of the copolymer in the aqueous dispersions may be from 20% to 70% in wet-spinning or from about 40% to 70% in dry-spinning. Preferably, a concentration of 30% to 50% is used in wet-spinning and about 50% to 55% in dry-spinning. In the dry-spinning of solutions or dispersions of the polymers, the stream or streams of the solution or dispersion issuing from the orifice or orifices of the extrusion device are generally subjected to a heated atmosphere immediately after issuance and for a considerable distance as they travel away from the extrusion device. This is generally effected in a chamber referred to as a spinning cell in which the heated atmosphere is introduced, either near the extrusion device when concurrent flow is desired or at the discharge end of the device when countercurrent flow is desired. The heated atmosphere may have a temperature within the cell ranging from about 30° C. up to 400° C. Generally, if the spinning solution is made with a volatile organic solvent, the temperature may be in the lower portion of this range, such as from about 30° to 90° C., whereas when an aqueous solution or aqueous dispersion is being spun, higher temperatures are generally employed in the cell. Specifically, when spinning an aqueous dispersion of an emulsion copolymerization, temperatures of 180° C. to 400° C. may be employed.

Generally, the formed structures are completely coalesced by the time they leave the spinning cell. However, in the event that the duration and intensity of heat treatment in the spinning cell are inadequate to completely coalesce the polymer particles within the formed structure when an aqueous copolymer dispersion is spun, an additional heating stage may be provided to complete the coalescence. This heating is performed at a temperature sufficiently high to carry the temperature of the shaped structure above the $T_i$ value (apparent second order transition temperature) of the copolymer and preferably at least about 30° above the $T_i$ value thereof.

The apparent second order transition temperature, here symbolized as $T_i$, is defined as that temperature at which the first derivative of thermodynamic variables, such as coefficient of expansion or heat capacity, undergoes a sudden change. The transition temperature is observed as an inflection temperature which is conveniently found by plotting the log of the modulus of rigidity against temperature. A suitable method for determining such modulus and transition temperature is described by Williamson in British Plastics 23, 87–90. The $T_i$ values here used are generally those temperatures at which the modulus is 300 kg./cm.$^2$ The $T_i$ values referred to are for polymers as such in a dry state unless otherwise designated.

The products, after leaving the spinning cell (whether dry-spinning, wet-spinning, or melt-spinning is used), may then be stretched to any extent desired, such as from about 5% to over 1000% of the length they have before stretching. Preferably at least 50% stretch is performed on the fiber.

In the wet-spinning of either solutions or aqueous dispersions of the copolymers, the liquid coagulating bath may be aqueous baths containing electrolytes, such as acids, alkalies, or salts. Generally, the electrolyte content should be from 5% to 50% and the temperature of the bath from about 20° to 105° C., preferably 30° to 45° C. However, when acid baths are used, much lower concentrations even as low as about ½ percent are effective to lower the pH to a value of 6 or less. Mixtures of the above electrolytes may be employed, such as an acid bath containing salts or an alkaline bath containing salts. Acid baths may be composed of aqueous solutions containing from ½ to 98% of an acid such as sulfuric acid or other inorganic acids, such as hydrochloric, phosphoric, boric, or sulfamic, or of organic acids such as oxalic, formic, acetic, citric, lactic, or an alkanesulfonic acid or arylsulfonic acid, such as ethanesulfonic or toluenesulfonic acids. The bath may have a pH value from about 1 to 6 and preferably between 1½ and 4. The bath may contain, besides the acid, buffering salts such as sodium dihydrogen phosphate. The acid baths may also contain small amounts of polyvalent metal salts, such as sulfates, chlorides or the like or iron (either ferrous or ferric), aluminum, zirconium, tin, cobalt, nickel, and zinc.

Alkaline baths may also be used as the coagulating baths for wet-spinning operations. The pH may be from 8 to 13 and is preferably at least 12 when aqueous dispersions of emulsion copolymers are used. To make up the alkaline baths, there may be used any water-soluble electrolytes or mixtures thereof such as sodium chloride, lithium chloride, potassium chloride, sodium carbonate, sodium sulfate, sodium acetate, potassium sulfate, sodium or potassium formate, or sodium phosphates of various types including complex phosphates, alkalies such as sodium or potassium hydroxide, or mixtures of such electrolytes may be used. Alkalinity may also be supplied by a quaternary ammonium hydroxide, such as trimethylbenzylammonium hydroxide, hydroxyethyltrimethylammonium hydroxide, or dimethyldibenzylammonium hydroxide. Organic materials such as glucose and urea may also be present in the bath.

Acidic, neutral or alkaline baths containing, as the major component of the solute, salts such as neutral, acidic or basic salts may be employed. For example, a coagulating bath may be composed of aqueous solutions of sodium sulfate, sodium chloride, ammonium chloride, sodium carbonate, sodium bisulfite, sodium acetate, borax, aluminum chloride, and so on.

Wet-spinning may also be performed by extrusion of the solution or dispersion of the polymer into organic liquids which are non-solvents for the polymer but are solvents for the water or organic liquid used for dissolving the polymer to make the spinning solution.

The immersion of the filaments or films in the coagulating bath may vary from a fraction of an inch, such as from ¼ to ½ inch, to several feet, such as three to four feet or more. In wet-spinning, the filaments, after removal from the coagulating bath, may be treated with a neutralizing agent, such as an aqueous acid solution when an alkaline coagulating bath is used, or an aqueous alkaline solution when an acid coagulating bath is used. Whether or not neutralization is first effected, rinsing may be effected, such as with water or even with organic liquids, but preferably with water.

The polymers of the present invention may be formed by any suitable polymerization procedure from a compound of Formula I if a homopolymer is desired or from a mixture of a compound of Formula I with one or more other monoethylenically unsaturated comonomers. The polymerization may be effected by the bulk, solution, emulsion, or suspension techniques. The product of a bulk polymerization procedure may be directly used as the starting material when fibers or films are formed by a melt-spinning or melt-extrusion technique. Solutions or dispersions obtained by the solution or emulsion polymerization techniques may provide spinning "dopes" which can be supplied directly to the extrusion devices for dry-spinning or wet-spinning. For example, a copolymer may be produced from polyvinyl acetate with about 3% to 30% of methoxymethyl vinyl sulfide. Such a polyvinyl acetate/methoxymethyl vinyl sulfide copolymer may be formed into filaments or films by the extrusion of solutions or aqueous dispersions thereof, or of melts thereof to form fibers which, after cross-linking by the procedure described hereinbelow, consist essentially of polyvinyl acetate cross-linked through the sulfide units. Hydrolysis of the vinyl acetate units in alkaline aqueous media of such a cross-linked copolymer is adapted to produce a cross-linked insoluble but swellable polyvinyl alcohol fiber or film. Copolymers of monomers of Formula I may be formed with other polyvinyl esters, such as the propionate, butyrate, laurate, and so on.

Other comonomers that may be copolymerized with the compound of Formula I to form binary, ternary, quaternary, and so on copolymers include ethylene, isobutylene, styrene, vinyltoluene, acrylonitrile, methacrylonitrile, vinylidene chloride, vinyl chloride, vinyl ethers such as methyl vinyl ether, acrylamide, methacrylamide; and acrylates, methacrylates, and itaconates of monohydric alcohols having 1 to 18 carbon atoms and of the monoethers of glycols, such as methyl acrylate, methyl methacrylate, ethyl acrylate and methacrylate, butyl acrylate and methacrylate, butoxyethyl acrylate and methacrylate.

The $T_i$ of the polymers may be anywhere from —40° C. to 200° C. or higher. For most purposes, polymers having $T_i$ values between 40° and 125° C. are the most useful. The molecular weight of the copolymers may be from 15,000 to 2,000,000 or more, but it is preferably at least 50,000.

Polymers of a compound of Formula I may also be spun into fibers that are valuable as ion-exchanging materials which can be formed into felt-like, woven, knitted or otherwise fabricated structures which can also serve for filtration purposes simultaneously with their cation- or anion-exchanging operation. Thus, a homopolymer of a compound of Formula I may be hydrolyzed to form thiol groups having cation-exchanging properties and a portion only of these groups may be oxidized to effect cross-linkage to impart the necessary insolubility of the fiber. Alternatively, a monomer of Formula I may be copolymerized with monomers containing ion-exchange groups, such as acrylic acid, methacrylic acid, dimethylaminoethyl methacrylate, and after being formed into fibers, the latter may be subjected to an agent for hydrolyzing alkoxymethyl groups to thiol groups which are then oxidized to cross-linking disulfide linkages to obtain the desired insolubilization. Alternatively, the monomer of Formula I may be copolymerized with monomers which introduce precursory units into the copolymer which can be modified, such as by hydrolysis, aminolysis, and oxidation, to form ion-exchange units. This modification may be effected at any time during the spinning before or after the cross-linking reaction is effected. Examples of such precursory monomers are methyl acrylate, acrylonitrile, acrylamide, etc. which can be hydrolyzed to form carboxyl units in the polymer or aminolyzed by means of amines, such as N,N'-dimethylethylenediamine to introduce amine groups in the polymer which in turn can be quaternized to form quaternary amonium compounds. The production of ion-exchange filmy structures, such as fibers, filaments, films, and pellicles, using a compound of Formula I is disclosed in copending application entitled "Ion-Exchange Fibers, Films and the Like and Their Production," Serial No. 587,925, filed on even date herewith and in the hands of a common assignee, and the entire disclosure of said application is incorporated herein by reference.

The polymers of a monomer of Formula I may be made by the use of suitable polymerization initiators or catalysts of which the following are typical: $\alpha,\alpha'$-bis-azoisobutyronitrile, dimethyl azobisisobutyrate, 2,2'-azobis-2,4-dimethylvaleronitrile, benzoyl peroxide, acetyl peroxide, lauroyl peroxide, tert-butyl hydroperoxide, di-tert-butyl peroxide, tert-butyl perbenzoate, stearoyl peroxide, cumene hydroperoxide, and "per-salts" such as ammonium persulfate and ammonium perborate. The catalysts are used in amounts from 0.2% to 5%, and preferably from 0.5% to 2%, based on the weight of the polymerizable compound or compounds.

The polymerization may be effected at temperatures from about room temperature up to about 100° C. for periods of time ranging from a few minutes to several hours. In producing emulsion copolymers, any of the initiators above may be used, but it is generally preferable to use ammonium, sodium, or potassium persulfate in conjunction with a reducing agent, such as a sulfite, bisulfite, metabisulfite or hydrosulfite of an alkali metal, to provide a redox system. The addition of a few parts per million of a polyvalent metal, such as iron, may also be used in the emulsion polymerization procedure. The monomer or mixture of monomers may be added gradually or in successive increments at spaced intervals throughout the polymerization or the entire monomer or monomer mixture may be polymerized as a single batch, regardless of which polymerizing system or technique is employed. As emulsifiers when emulsion polymerization is employed, there may be used any of the conventional anionic, cationic, or non-ionic emulsifiers, such as fatty acid soaps, including sodium oleate, sodium laurate, sodium stearate and so on, also sodium dodecylsulfate or sulfonate, sodium pentadecylbenzenesulfonate, sodium octylphenoxyethoxyethylsulfonate, octylphenoxypolyethoxyethanol, tetradecylthiopolyethoxyethanol, ethylene oxide condensates of tall oil and other long-chained fatty acids, lauryldimethylbenzylammonium chloride, or any of the many wetting agents and emulsifiers which are generally advocated for forming aqueous emulsions. Some emulsifiers are better for handling a given monomer or a mixture of monomers than others.

Whether the fiber or films are formed by a melt-spinning, wet-spinning or dry-spinning technique, they are adapted to be cross-linked into a relatively stabilized condition at any stage of the spinning operation after discharge from the orifice or orifices of the extrusion device by first effecting a hydrolysis in an acid medium and then effecting a mild oxidation, the oxidation being accompanied by or followed by a heating stage. The hydrolysis appears to replace the —R'OR" groups with a hydrogen atom, which then apparently renders these points of the copolymers susceptible to form disulfide linkages by reaction with each other during the subsequent oxidation. The hydrolysis may be effected in acid solutions having concentrations of anywhere from about ¼% to 25% or higher. When the coagulating bath used in wet-spinning techniques is an acid bath, it appears that at least some, if not all, of the hydrolysis can be effected at this stage. The oxidation requires mild oxidation agents only, such as the presence of air, or more conveniently the treatment with dilute solutions of at least about ¼% of an oxidizing agent, such as an aqueous solution of hydrogen peroxide, chlorine, sodium hypochlorite, calcium hypochlorite, nitric acid, potassium permanganate, peracetic acid, performic acid, or potassium dichromate, or alcoholic solutions of iodine may be employed such as a solution of at least about ¹⁄₁₀% to ¼% up to 25% or more iodine in methanol, ethanol, isopropanol, and so on.

The polymer product may be treated with the solution of the oxidizing agent at any temperature from room temperature up to about 80° C. or higher for various periods of time. For example, the treatment may be effected for about one-quarter of an hour to an hour at room temperature and for comparatively reduced periods of time from about 10 seconds to 15 minutes at about 80° C. Longer periods of time may be employed at any of the temperatures in the range mentioned but generally the periods mentioned are adequate. The permissible upper limits of the conditions of temperature, time, and concentration depend on the individual oxidizing agent and they are correlated to provide a mild oxidation which serves to effect cross-linking, but does not go appreciably further to form substantial amounts of sulfone and sulfonic acid groups. The upper limit of concentration depends on the individual agent and the temperature at which the oxidation is carried out. If the temperature is kept low, such as at normal room temperature, concentrations as high as 3% to 5% or in some cases even up to 10% to 25% may be employed without substantial conversion of the —SR'OR" groups to sulfones and/or sulfonic acids. At higher temperatures up to 50° C. to 80° C., the concentration of the stronger agents must be progressively lowered to avoid substantial conversion to sulfones and sulfonic acids.

In many cases, it may be desirable to carry out the main part of the heating to effect the cross-linking, after a relatively limited period of treatment in a solution of the oxidant which serves primarily to effect impregnation of the fiber, film, filament bundle or the like with the oxidant and may or may not serve to effect a portion of the desired cross-linking. The subsequent heating stage in such event may be termed a baking or curing step and may be carried out at temperatures of 50° C. to 200° C. but, as discussed hereinbefore, the upper limit of temperature in this stage is dependent on the particular oxidant employed. In such cases, after removal of the polymer product from the medium containing the oxidizing agent, the excess of such medium may be removed as by suction, squeezing, or air-squeegeeing and the oxidation which may or may not have been started while the polymer product is immersed in the medium containing oxidizing agent may be pushed to completion by subsequently heating the polymer product at elevated temperatures from about 80° C. to 200° C. for a period of time ranging from about 5 minutes to about half an hour at the higher temperature to about 15 minutes to about an hour or two at the lower temperature.

As stated previously, the cross-linking operation may be effected at any stage of the fiber- or filament-forming process. For example, it may be performed upon the freshly-formed fibers directly after they are removed from the spinneret in a melt-spinning operation. However, it is generally preferable, in order to provide structural products having increased strengths, to stretch the products before effecting the cross-linking thereof. This, however, does not preclude the treatment with an acid bath before the stretching operation since the hydrolysis effected by the acid bath alone is not adequate to complete the cross-linking. Essentially, the hydrolyzed polymer is still a linear thermoplastic polymer and it is only cross-linked during and after oxidation. In dry-spinning and wet-spinning operations, it is permissible to use an acid coagulating bath wherein the initial stage of hydrolysis, wherein the polymer is prepared for later cross-linking, may proceed. Of course, if, in the particular products desired, there is no need for orientation or stretching to impart greater strength to the products, whether fibers or films, the cross-linking may be effected soon after the coalescence of the polymer into the fibrous or pellicular form has been completed. However, when aqueous copolymer dispersions are spun either by a wet-spinning or dry-spinning operation and a so-called "fuse-drying" stage is employed to effect complete coalescence of the particles into a continuous mass, it is generally desirable and, in most cases, essential that the fuse-drying, which is effected at relatively high temperatures of at least 30° C. above the $T_1$ value of the copolymer (such as from 60° to 400° C.), be effected before the cross-linking is effected. Also, if an acid coagulating bath is employed for the coagulation of the aqueous copolymer dispersion, it is important to remove the acid before the fuse-drying or stretching or to have a reducing agent present during these operations in order to avoid the possibility of cross-linking, which apparently is caused by oxidation, during the fuse-drying or stretching.

The spinneret or like extrusion device may be fed with the dispersion from a suitable feed- or supply tank by a constant pressure or constant displacement method. This may be accomplished by the use of an oil ram operated either pneumatically, hydraulically, or mechanically. Where no harm is done when the dispersion is subjected directly to air pressure or to the pressure of a suitable gas, compressed air or gas may be introduced into the tank directly over the dispersion under the control of a suitable pressure regulating system in conventional manner. When the dispersions have satisfactory stability against mechanical shear, they may be fed to the spinnerets by suitable pumps and especially the conventional gear pumps which may be provided with the conventional by-pass for controlling the pressure.

The size of the orifices of the spinneret may be from about 0.5 to 10 mils or more up to 20 mils in diameter. For fine filaments, the usual size of orifices, namely 2.5 to 4 mils in diameter, may be used, whereas for larger filaments orifices having diameters of 5 to 9 mils may be used. Orifices of even larger size may be used to produce monofils, and, besides having a round cross-section, they may be of various cross-sections such as oval, elliptical, or of a rectangular slit or slot-like shape to produce ribbons or films of various widths.

The films or filaments may be withdrawn from the extrusion device at the same speed as the linear speed of extrusion or at a speed which is considerably higher or considerably less than the speed of extrusion. For example, the withdrawal speed may be used which is as low as 20% of the linear speed of extrusion or a speed of twice to three times the linear speed of extrusion. The speed of withdrawal may vary from one meter to 100 meters per minute or higher. When a film is produced, it may be wound on a mandrel after completion of the cross-linking operation and preferably after the cross-linked film has been dried. When filaments are produced, they may be collected by winding on a bobbin or on a centrifugal bucket or pot, the latter having the advantage of imparting a small amount of twist, such as from 1½ to 2½ turns per inch to the filament bundle or yarn when a multi-holed spinneret is used. Collection is preferably made after completion of the cross-linking and drying operations.

During the stretching of the filaments or films, they may be heated to temperatures of 70° to 300° C. by passage through a heated atmosphere or over a smooth heated plate such as of metal. The extent of stretch may be controlled such as by arranging the heated atmosphere or plate, through or over which the filaments or films pass, between a pair of wheels or godets which have the desired differences in speed so that the linear velocity of the filaments about the periphery of the second godet is a predetermined greater value from 50 to 1000% or more greater than the peripheral velocity of the first godet.

When an aqueous copolymer dispersion is spun, a fusion-aid may be employed. These materials may be introduced into the aqueous polymer dispersion either before emulsion polymerization of the monomers or after such polymerization. Compounds effective for this purpose have solubility in the polymer and have a favorable distribution coefficient in a polymer-water system. A copolymer of 70 parts of acrylonitrile, 5 parts of methoxymethyl vinyl sulfide, and 25 parts of 3,3,5-trimethylcyclohexyl acrylate may be used with adiponitrile, α-methylsuccinonitrile, and nitromethane.

Also effective as fusion-aids for polymers formed in major proportion from acrylonitrile or methacrylonitrile are phenylacetonitrile, butyronitrile, hexanenitrile, α-methylsuccinonitrile, acrylonitrile, or methacrylonitrile monomers, endomethylenetetrahydrobenzonitrile, succinonitrile, benzonitrile, isobutyronitrile, and furonitrile.

Toluene, xylene, chlorinated hydrocarbons, such as chloroform and ethylene dichloride, ethyl acetate and butyl acetate are useful fusion-aids for copolymers of 80% methyl methacrylate, 7% of methoxymethyl vinyl sulfide, and 13% of ethyl acrylate. From 1% to 40% by weight of a fusion-aid based on the weight of the copolymer may be used, 10 to 20% being preferably used.

When the fibers or films have been stretched longitudinally, the polymer molecules are at least partially oriented along the fiber axis or lengthwise of the film and the extent of orientation depends on the degree of stretch. Heating such fibers or films very quickly causes shrinkage or retraction and loss of a great deal or all of the orientation at relatively low temperatures. By subjecting the stretched fibers or films to the cross-linking procedure of the present invention, the temperature at which substantial shrinkage of the fiber or film occurs is elevated substantially and the extent of shrinkage at a given elevated temperature, such as at 200° C., for example, is greatly reduced. In general, the cross-linking operation of the present invention may be executed in a manner so that the fiber or film shows markedly reduced shrinkage, and in many cases is practically stabilized against shrinkage, when subsequently heated, as in ironing or laundering operations, to a temperature well above the $T_i$ value of the uncross-linked polymer from which it is originally spun.

The filaments, fibers, films or threads, cords and fabrics formed thereof may be subjected to other customary finishing processes, such as crimping, curling, twisting, sizing, softening or lubricating to facilitate weaving, knitting and other textile operations.

The films produced by the present invention are useful as wrapping materials, as water-proof doilies, baby pants, raincoats, and so on.

The filaments, threads, or yarns produced by the above described procedural steps are useful in the preparation of various types of fabrics. For example, they are useful in making the fabric base for elastic rubber coated sheet, in the construction of carpets, rugs, upholstery fabrics, and crepe goods. They are useful in fabrics where controlled shrinkage is desired as in filter cloths or tightly woven materials used in rainwear. Filaments or threads may be cut and used in the construction of non-woven fabrics and used as staple fiber for spinning yarns by the woolen, worsted, or cotton systems or in mixed systems.

Uncross-linked fibers or filaments of the present invention, and especially those formed from copolymers containing 0.2% to 30% of the sulfide units of Formula I, whether stretched or un-stretched, may be converted into fabricated structures before the cross-linking is effected by the mild oxidation of the polymer, and then at some stage during or after the fabrication, the cross-linking may be performed upon the fabric. Fabricating procedures that may be employed include the formation of yarns by twisting together of continuous filaments or by the drafting and twisting of staple fibers formed of the polymers. Also included are plied yarns or cords obtained by doubling two or more of the twisted yarns obtained either from continuous filaments or staple fibers. Besides the yarns and cords, textile fabrics may be formed therefrom by weaving, knitting, braiding, or knotting of the yarns. Non-woven fabrics are contemplated in which the fibers formed of the polymers of compounds of Formula I are distributed haphazardly to form a felt-like or paper-like structure either of low density or of compact structure. For example, such non-woven fabrics may be produced by carding the polymer fibers with or without additional fibers of textile type or paper-making length, such as of woodpulp, cotton, silk, rayon, wool, linen, nylon, polyethylene terephthalate and so on, and subsequently rendering some of the fibers in the products adhesive by heating. When reliance is placed upon fibers formed of polymers of compounds of Formula I for adhesion, the heating thereof to tacky condition may be followed by treating with an oxidizing agent and heating to effect cross-linking and thereby reduced shrinkage or stabilization of the adhered fibers in the structure.

In the following examples, which are illustrative of the invention, the parts given are by weight unless otherwise noted:

*Example 1*

(a) To 200 parts of distilled water at room temperature, there is added 6 parts of an aqueous solution containing 2% of ferrous sulfate heptahydrate and 4% of the sodium salt of ethylenediaminotetraacetic acid adjusted to pH 4 with 0.5 N sulfuric acid solution. Then 5 parts of potassium laurate is added, followed by 0.6 part of sodium formaldehyde sulfoxylate dihydrate. The pH of the solution is adjusted to 10.5 with 0.5 N NaOH. A mixture of 70 parts of acrylonitrile, 10 parts of butoxyethyl acrylate and 20 parts of methoxymethyl vinyl sulfide is added with stirring. Then 20 parts of methylsuccinonitrile (fusion-aid) is added with stirring, and the air above the resulting emulsion is replaced by nitrogen. To the emulsion is now added 0.15 part of phenylcyclohexane hydroperoxide as a 10% solution in toluene. After a short induction period, polymerization starts as evidenced by a sharp temperature rise. The temperature is now controlled by cooling to remain in the range 35° to 40° C. Over 85% conversion to a dispersion of fine particle size (less than 0.1 micron in diameter) is achieved in about ½ hour after addition of the phenylcyclohexane hydroperoxide.

(b) The dispersion obtained in part (a) is spun into an aqueous 10% sodium bisulfite bath at 80° C. using a 40-hole (each of 2.5 mil diameter) spinneret at a pumping rate of 2.8 grams per minute, and a 4-inch bath immersion. The yarn is then washed in water at room temperature, fuse-dried at 260° C., and heat-stretched at 140° C. about 600%. It is then treated with 4% phosphoric acid for one hour at 40° C., and then treated with a solution of 5% iodine in ethanol at 40° C. for one hour. The yarn is withdrawn from the solution, excess iodine solution is removed, and the yarn is then cured by heating at constant length at 150° C. for 40 minutes. It has a tensile strength of 3.0 grams per denier and an extensibility at break of 28%. The temperature at which the yarn shows 5% shrinkage is 150° C. It shrinks only a total of 20% on being heated to 200° C. Yarn similarly produced from the same copolymer dispersion but without treatment by the phosphoric acid, iodine solution, and subsequent heating shows 5% shrinkage at 75° C. and shrinks 75% on being heated to 200% C.

*Example 2*

(a) A copolymer dispersion is made by the procedure of Example 1(a) substituting a mixture of 60 parts of acrylonitrile, 20 parts of 3,3,5-trimethylcyclohexyl acrylate, and 20 parts of methoxymethyl vinyl sulfide.

(b) The dispersion obtained in part a hereof is concentrated by boiling at about 100 mm. of Hg pressure until the polymer solids content reaches about 43%. The concentrated dispersion is then forced under air pressure through a short glass capillary about ½ inch long and 0.008 inch (8 mils) inside diameter at a rate of about 0.4 gram per minute into a chamber containing air at 200° C. On pulling the droplet which initially forms away from the tip of the capillary, a filament is formed which is drawn away at a rate of about 5 meters per minute. The filament is subjected to a temperature of about 280° C. for a few seconds in order to fuse the particles of polymer into a strong shiny filament which is then stretched 600% as it passes between differentially driven godets over a smooth glass surface heated to about 130° C. After the stretching step, a portion of the fiber is treated with 6% aqueous phosphoric acid solution at 50° C. for 10 minutes and then with aqueous 5% sodium hypochlorite solution at 50° C. for one hour. The resulting filament has a tenacity of about 2.5 grams per denier and an elongation at break of about 20%. The filament shows reduced shrinkage on heating comparable to that obtained in the cross-linked yarn of Example 1(b).

*Example 3*

(a) A copolymer dispersion is made by the procedure of Example 1(a) substituting a mixture of 40 parts of acrylonitrile, 40 parts of 3,3,5-trimethylcyclohexyl acrylate, and 20 parts of methoxymethyl vinyl sulfide.

(b) The dispersion obtained in part a hereof is spun through a spinneret into an aqueous 7% phosphoric acid solution, washed in hot water (70° C. ca.), fuse-dried at 200° C., and stretched 800% at 100° C. The yarn is then treated in a 5% solution of iodine in ethanol at room temperature for one hour, and, after removal of excess iodine solution therefrom, it is heated one hour at 150° C. while allowing 5% relaxation. The yarn has a tensile strength of 1.9 grams/denier, an extensibility at break of 14%, a 5% shrinkage on reaching 141° C. and 20% shrinkage at 200° C. Uncross-linked yarn produced by the same process, but omitting the treatment with iodine and subsequent heating shows substantially the same strength and extensibility but shrinks 5% at 50° C., and 75% at 200° C.

*Example 4*

A copolymer is prepared from a mixture of 67% vinylidene chloride, 30% of vinyl acetate and 3% of the compound of the formula $$CH_2=C(CH_3)SC(CH_3)_2OC_2H_5$$

and is dissolved in acetone to produce a 17% concentration. The solution is extruded through a 40-hole spinneret downwardly into a countercurrently flowing stream of heated air introduced into the bottom of a ten-foot high spinning cell at a temperature of 50° C. After emergence from the cell, the yarn is stretched 80% as it passes between differential speed godets through air heated to a temperature of about 80° C. The stretched yarn is soaked in an aqueous 4% phosphoric acid bath for half an hour and is then soaked in aqueous 10% hydrogen peroxide for 50 minutes. After removal of excess solution, the yarn is heated at 110° C. for one hour. The yarn resists shrinkage at temperatures substantially above the boiling point of water.

*Example 5*

An aqueous dispersion of a copolymer is prepared by emulsion copolymerization of a mixture of 50 parts of butadiene, 35 parts of styrene and 15 parts of methoxymethyl vinyl sulfide and is spun at a solids concentration of 30% in accordance with the procedure of Example 1(b). The cross-linked yarn obtained shows markedly reduced shrinkage as compared to similar yarn produced without the oxidative cross-linking.

*Example 6*

An aqueous dispersion of a copolymer of 55 parts of methyl methacrylate, 15 parts of butyl acrylate and 30 parts of a compound of the formula $$CH_2=CHSCH(CH_3)OCH_3$$

made by a procedure similar to that of Example 1(a) is spun and cross-linked by the procedure of Example 1(b), except that the temperature of curing is 100° C.

*Example 7*

An aqueous dispersion of a copolymer of 70% acrylonitrile, 20% butoxyethyl acrylate, and 10% of methoxymethyl vinyl sulfide prepared as in Example 1(a) is spun through a spinneret into an aqueous 7% phosphoric acid solution, washed in water at about 70° C., fuse-dried at 200° C., and stretched about 800% at 100° C. The stretched yarn is treated in an aqueous 4% solution of phosphoric acid at 40° C. for one hour, then treated in a 5% iodine solution in ethanol at 40° C. for one hour. After removal of excess iodine solution therefrom, the yarn is heated at 150° C. for 40 minutes. The yarn has a tensile strength of 1.6 grams per denier and an extensibility of 20% at break. It shows 5% shrinkage on heating to 117° C. and shrinks only 39% at 200° C.

*Example 8*

An aqueous dispersion of a copolymer of 70% acrylonitrile, 15% butoxyethyl acrylate, and 15% of methoxymethyl vinyl sulfide prepared as in Example 1(a) is spun through a spinneret into an aqueous 7% phosphoric acid solution, washed in water at about 70° C., fuse-dried at 200° C., and stretched about 800% in 100° C. The stretched yarn is treated in an aqueous 4% solution of phosphoric acid at 40° C. for one hour, then treated in a 5% iodine solution in ethanol at 40° C. for one hour. After removal of excess iodine solution therefrom, the yarn is heated at 150° C. for 40 minutes. The yarn has a tensile strength of 2.7 grams per denier and an extensibility of 16% at break. It shows 5% shrinkage on heating to 116° C. and shrinks only 33% at 200° C.

*Example 9*

An aqueous dispersion of a copolymer of 70% acrylonitrile, 25% butoxyethyl acrylate, and 5% of methoxymethyl vinyl sulfide prepared as in Example 1(a) is spun through a spinneret into an aqueous 7% phosphoric acid solution, washed in water at about 70° C., fuse-dried at 200° C., and stretched about 800% at 100° C. The stretched yarn is treated in an aqueous 4% solution of phosphoric acid at 40° C. for one hour, then treated in a 5% iodine solution in ethanol at 40° C. for one hour. After removal of excess iodine solution therefrom, the yarn is heated at 130° C. for 90 minutes. The yarn has a tensile strength of 1.4 grams per denier and an extensibility of 25% at break.

*Example 10*

The yarn prepared by the procedure of Example 1 (except that the treatment with phosphoric acid and iodine and the heating to 150° C. for 40 minutes thereafter are omitted) is cut to staple fiber of 2-inch length and spun into yarn which is woven into a fabric. The fabric is then subjected to the treatments with phosphoric acid and iodine and is then heated while held against shrinkage in a tenter frame at 150° C. for fifteen minutes.

It is to be understood that changes and variations may be made without departing from the spirit and scope of the invention as defined in the appended claims.

We claim:

1. As an article of manufacture, a solid polymeric product comprising a cross-linked product of molecules of a linear addition copolymer containing (A) about 0.2% to 30% by weight of units of a vinyl sulfide of the formula $H_2C=C(R)SR'OR''$ where R is selected from the group consisting of H and $CH_3$,
R' is selected from the group consisting of $-CH_2-$, $-CH(CH_3)-$, and $-C(CH_3)_2-$ and
R'' is an alkyl group and (B) about 70 to 99.8% by weight of units derived from other copolymerizable monoethylenically unsaturated molecules, the total of units of the classes A and B above in the linear copolymer amounting to 100 weight percent, said linear copolymer molecules being cross-linked in said product by disulfide linkages formed by hydroylsis and oxidation of at least 0.2% by weight of the A units.

2. As an article of manufacture, a fiber comprising a cross-linked product of molecules, at least partially oriented in the longitudinal direction of the fiber, of a water-insoluble linear addition copolymer containing (A) about 0.2 to 30% by weight of units of a vinyl sulfide of the formula $H_2C=C(R)SR'OR''$ where R is selected from the group consisting of H and $CH_3$,
R' is selected from the group consisting of $-CH_2-$, $-CH(CH_3)-$, and $-C(CH_3)_2-$ and
R'' is an alkyl group and (B) about 70 to 99.8% by weight of units derived from other copolymerizable monoethylenically unsaturated molecules, the total of units of the classes A and B above in the linear copolymer amounting to 100 weight percent, said linear copolymer molecules being cross-linked in said product by disulfide linkages formed by hydrolysis and oxidation of at least 0.2% by weight of the A units.

3. As an article of manufacture, a fiber comprising a cross-linked product of molecules of a water-insoluble linear addition copolymer containing (A) about 0.2 to 30% by weight of units of methoxymethyl vinyl sulfide, and (B) about 70 to 99.8% of units derived from other monoethylenically unsaturated molecules copolymerizable therewith, the total of units of the classes A and B above in the linear copolymer amounting to 100 weight percent, said linear copolymer molecules being cross-linked in said product by disulfide linkages formed by hydrolysis and oxidation of at least 0.2% by weight of the A units.

4. As an article of manufacture, a fiber comprising a cross-linked product of molecules of at least one water-insoluble linear addition copolymer of (A) 0.2 to 30% by weight of methoxymethyl vinyl sulfide and (B) about 70 to 99.8% by weight of other monoethylenically unsaturated molecules copolymerizable therewith comprising at least one ester of an aliphatic alcohol having 1 to 18 carbon atoms with an acid of the formula $$H_2C=C-(CH_2)_{n-1}H$$
$$\overset{|}{COOH}$$

wherein $n$ is an integer having a value of 1 to 2, the total of units of the classes A and B above in the linear copolymer amounting to 100 weight percent, said linear copolymer molecules being cross-linked in said product by disulfide linkages formed by hydrolysis and oxidation of at least 0.2% by weight of the A units.

5. As an article of manufacture, a fiber comprising a cross-linked product of molecules of a water-insoluble linear addition copolymer of (A) 0.1 to 30% by weight of methoxymethyl vinyl sulfide and (B) about 70 to 99.8% by weight of other monoethylenically unsaturated molecules copolymerizable therewith comprising acrylonitrile and butoxyethyl acrylate, the total of units of the classes A and B above in the linear copolymer amounting to 100 weight percent, said linear copolymer molecules being cross-linked in said product by disulfide linkages formed by hydrolysis and oxidation of at least 0.2% by weight of the A units.

6. As an article of manufacture, a fiber comprising a cross-linked product of molecules of a water-insoluble linear addition copolymer of (A) 0.2 to 30% by weight of methoxymethyl vinyl sulfide and (B) about 70 to 99.8% by weight of other monoethylenically unsaturated molecules copolymerizable therewith comprising acrylonitrile and 3,3,5-trimethylcyclohexyl acrylate, the total of units of the classes A and B above in the linear copolymer amounting to 100 weight percent, said linear copolymer molecules being cross-linked in said product by disulfide linkages formed by hydrolysis and oxidation of at least 0.2% by weight of the A units.

7. As an article of manufacture, a fiber comprising a cross-linked product of molecules of a water-insoluble linear addition copolymer of (A) 0.2 to 30% by weight of methoxymethyl vinyl sulfide and (B) about 70 to 99.8% by weight of other monoethylenically unsaturated molecules copolymerizable therewith comprising vinylidene chloride and vinyl acetate, the total of units of the classes A and B above in the linear copolymer amounting to 100 weight percent, said linear copolymer molecules being cross-linked in said product by disulfide linkages formed by hydrolysis and oxidation of at least 0.2% by weight of the A units.

8. As an article of manufacture, a fiber comprising a cross-linked product of molecules of a water-insoluble linear addition copolymer of (A) 0.2 to 30% by weight of methoxymethyl vinyl sulfide and (B) about 70 to 99.8% by weight of other monoethylenically unsaturated molecules copolymerizable therewith comprising butadiene and styrene, the total of units of the classes A and B above in the linear copolymer amounting to 100 weight percent, said linear copolymer molecules being cross-linked in said product by disulfide linkages formed by hydrolysis and oxidation of at least 0.2% by weight of the A units.

9. As an article of manufacture, a fiber comprising a cross-linked product of molecules of a water-insoluble linear addition copolymer of (A) 0.2 to 30% by weight of methoxymethyl vinyl sulfide and (B) about 70 to 99.8% by weight of other monoethylenically unsaturated molecules copolymerizable therewith comprising methyl methacrylate and butylacrylate, the total of units of the classes A and B above in the linear copolymer amounting to 100 weight percent, said linear copolymer molecules being cross-linked in said product by disulfide linkages formed by hydrolysis and oxidation of at least 0.2% by weight of the A units.

10. As an article of manufacture, a solid film comprising a cross-linked product of molecules of a linear addition copolymer containing (A) about 0.2% to 30% by weight of units of a vinyl sulfide of the formula $$H_2C=C(R)SR'OR''$$

where
R is selected from the group consisting of H and $CH_3$,
R' is selected from the group consisting of $-CH_2-$, $-CH(CH_3)-$, and $-C(CH_3)_2-$, and
R'' is an alkyl group, and (B) about 70 to 99.8% by weight of units derived from other copolymerizable monoethylenically unsaturated molecules, the total of units of the classes A and B above in the linear copolymer amounting to 100 weight percent, said linear copolymer molecules being cross-linked in said film by disulfide linkages formed by hydrolysis and oxidation of at least 0.2% by weight of the A units.

11. As an article of manufacture, a self-supporting pellicle comprising a cross-linked product of molecules, at least partially oriented in the longitudinal direction of the pellicle, of a water-insoluble linear addition copolymer containing (A) about 0.2 to 30% by weight of units of a vinyl sulfide of the formula $$H_2C=C(R)SR'OR''$$

where
R is selected from the group consisting of H and $CH_3$,
R' is selected from the group consisting of $-CH_2-$, $-CH(CH_3)-$, and $-C(CH_3)_2-$, and
R'' is an alkyl group, and (B) about 70 to 99.8% by weight of units derived from other copolymerizable monoethylenically unsaturated molecules, the total of units of the classes A and B above in the linear copolymer amounting to 100 weight percent, said linear copolymer molecules being cross-linked in said pellicle by disulfide linkages formed by hydrolysis and oxidation of at least 0.2% by weight of the A units.

12. A process for making a polymeric product comprising subjecting a water-insoluble linear adition copolymer of monoethylenically unsaturated molecules comprising about 0.2 to 30% by weight of an alkoxymethyl sulfide of the formula $$H_2C=C(R)SR'OR''$$

where
R is selected from the group consisting of H and $CH_3$,
$R_2$ is selected from the group consisting of $-CH_2-$, $-CH(CH_3)-$, and $-C(CH_3)_2-$, and
R'' is an alkyl group, to an acid medium to hydrolyze the alkoxymethyl sulfide groups to thiol groups, and then treating the hydrolyzed copolymer with an oxidizing agent which reacts with the thiol groups to form disulfide linkages between the copolymer molecules, thereby effecting cross-linking of the copolymer molecules through the sulfide units thereof.

13. A process for making a film comprising extruding through an orifice having a small dimension of the order of one-half to twenty mils a water-insoluble linear addition copolymer of monoethylenically unsaturated molecules comprising about 0.2 to 30% by weight of an alkoxymethyl sulfide of the formula $$H_2C=C(R)SR'OR''$$

where
R is selected from the group consisting of H and $CH_3$,
R' is selected from the group consisting of $-CH_2-$, $-CH(CH_3)-$, and $-C(CH_3)_2-$, and
R'' is an alkyl group, subjecting the polymer in the form of a film obtained from the extrusion to an acid medium to hydrolyze the alkoxymethyl sulfide groups to thiol groups, and then treating the hydrolyzed polymer in the film with an oxidizing agent which reacts with the thiol groups to form disulfide linkages between the copolymer molecules, thereby effecting cross-linking of the copolymer molecules through the sulfide units thereof.

14. A process according to claim 13 in which the film is stretched prior to the oxidizing treatment.

15. A process for making a fiber comprising extruding through a spinneret having at least one orifice having a diameter of the order of one-half to twenty mils a water-insoluble linear addition copolymer of monoethylenically unsaturated molecules comprising about 0.2 to 30% by weight of an alkoxymethyl sulfide of the formula $$H_2C=C(R)SR'OR''$$

where
R is selected from the group consisting of H and $CH_3$,
R' is selected from the group consisting of $-CH_2-$, $-CH(CH_3)-$, and $-C(CH_3)_2-$, and
R'' is an alkyl group, subjecting the polymer in the form of a fiber obtained from the extrustion to an acid medium to hydrolyze the alkoxymethyl sulfide groups to thiol groups, and then treating the hydrolyzed polymer in the fiber with an oxidizing agent which reacts with the thiol groups to form disulfide linkages between the copolymer molecules, thereby effecting cross-linking of the copolymer molecules through the sulfide units thereof.

16. A process according to claim 15 in which the fiber is stretched prior to the oxidizing treatment.

17. A process for making a fiber comprising extruding through a spinneret having at least one orifice having a diameter of the order of one-half to twenty mils a water-insoluble linear addition copolymer of monoethylenically unsaturated molecules comprising about 0.2 to 30% by weight of methoxymethyl vinyl sulfide and about 70 to 99.8% of other copolymerizable monomers, subjecting the fiber to an acid medium to hydrolyze the methoxymethyl sulfide groups to thiol groups, and then treating the fiber with an oxidizing agent which reacts with the thiol groups to form disulfide linkages between the copolymer molecules, thereby effecting cross-linking of the copolymer molecules through the sulfide units thereof.

18. A process as defined in claim 17 in which the orifice is circular and the fiber produced is stretched at least 50% prior to the oxidizing treatment and the process also comprises heating the fiber after removal of excess oxidizing agent at a temperature of about 80° to 200° C.

19. A process as defined in claim 18 in which the fiber produced is fabricated into a textile fabric structure after stretching but before the oxidizing treatment.

References Cited in the file of this patent

UNITED STATES PATENTS

| | | |
|---|---|---|
| 2,605,509 | Dreisbach | Aug. 5, 1952 |
| 2,636,022 | Brooks | Apr. 21, 1953 |
| 2,712,490 | Stuchlik | July 5, 1955 |
| 2,729,019 | Melamed | Dec. 13, 1955 |
| 2,806,884 | Tapp | Sept. 17, 1957 |
| 2,868,738 | Hwa | Jan. 13, 1959 |

UNITED STATES PATENT OFFICE

CERTIFICATE OF CORRECTION

Patent No. 2,933,479                              April 19, 1960

Charles H. McBurney et al.

It is herby certified that error appears in the printed specification of the above numbered patent requiring correction and that the said Letters Patent should read as corrected below.

Column 16, list of References Cited, under the heading "UNITED STATES PATENTS" add the following:

```
2,392,294   Rust------------------Jan.  1, 1946
2,563,383   Vaughan et al---------Aug.  7, 1951
2,664,414   Morris et al----------Dec. 29, 1953
```

Signed and sealed this 27th day of December 1960.

(SEAL)
Attest:
KARL H. AXLINE
Attesting Officer

ROBERT C. WATSON
Commissioner of Patents